United States Patent Office 3,353,972
Patented Nov. 21, 1967

3,353,972
FLEXOGRAPHIC INKS CONTAINING
SOLUBLE DYES
Gabriel John Sinclair, Hasbrouck Heights, N.J., assignor to Interchemical Corporation, New York, N.Y., a corporation of Ohio
No Drawing. Filed Sept. 21, 1964, Ser. No. 398,033
5 Claims. (Cl. 106—22)

ABSTRACT OF THE DISCLOSURE

A flexographic printing ink composed of an alcohol-soluble resin, a dye selected from either a colored quaternary ammonium triphenylmethane salt or quaternary ammonium diphenylmethane salt, and 4,4-bis (p-hydroxyphenyl) pentanoic acid in an alkanol solvent. The pentanoic acid derivative solubilizes the dyes in the composition to prevent precipitation or "seeding-out."

This invention relates to flexographic inks and particularly to flexographic ink having soluble dyes.

Flexographic printing is a letter-press process and is characterized by the fact that the ink is applied to the work by rotary rubber plates. Due to the great flexibility of the process, its low operating costs, and the extremely high press speeds, possible even when printing on troublesome stocks, it is widely used for printing on packaging materials such as metal foils and kraft paper and on transparent materials such as cellophane, glassine and polyethylene films.

It is particularly for printing on such transparent packaging materials that there is a demand for transparent flexographic printing inks. In order to achieve such transparentness, soluble dyes must often be used. Basic dyes such as the colored salts of quaternary ammonium diphenylmethane and triphenylmethane have given less than fully desirable results when used in the conventional "spirit" or "aniline" type flexographic inks which employ solvents predominantly lower alkanol in nature, particularly alkanols having from one to three carbons such as methanol, ethanol and isopropanol.

It appears that these dyes are not completely soluble in the lower alkanol solvents and display a tendency to partially precipitate or "seed-out" from the solution. In many cases, it is necessary to heat mixtures of the dyes and solvents in order to initially dissolve the dyes. Unfortunately, the application of heat to dissolve the dyes has resulted in even more extensive precipitation or "seeding-out" of the dyes from the ink after subsequent cooling.

Such "seeding-out" is obviously undesirable because a portion of the dye which is probably the most expensive component in the ink is rendered ineffective, and because of the reduction of the dye content in the solution, the printed colors are weakened.

I have now discovered that the addition of 4,4-bis(p-hydroxyphenyl) pentanoic acid sold commercially as Diphenolic Acid to the flexographic ink will substantially eliminate "seeding-out." Furthermore, it renders the quaternary ammonium diphenyl- and triphenylmethane salts completely soluble even in unheated lower alkanol solvents making heating unnecessary.

The basic dyes which are solubilized by the 4,4-bis(p-hydroxyphenyl) pentanoic acid are colored quaternary ammonium diphenylmethane and triphenylmethane salts such as Malachite Green, Brilliant Green, Methyl Violet, Rhodamine B, Victoria Blue, Auramine O and Auramine G. The dyes are added to the ink composition in the colored or salt form.

The flexographic inks may contain the conventional "spirit-soluble" or alcohol soluble binder resins such as shellac, nitrocellulose, rosin, modified rosins and alcohol soluble maleic resins.

The solvents are predominantly the lower alkanols. Preferably they constitute at least 75% of the solvent content of the inks. Minor amounts of other solvents may be used in these inks in combination with the alcohol. Such solvents include ethyl acetate, isopropyl acetate, and methyl ethyl ketone, ethylene glycol monoethyl ether, ethylene glycol monomethyl ether. Even small amounts of water may be included.

The inks may also contain any of the conventional additives to flexographic inks such as waxes and plasticizers.

The 4,4-bis(p-hydroxyphenyl) pentanoic acid added preferably constitutes from 10 to 20% and most preferably from 14.5 to 17% of the weight of the ink. The other components are present in conventional proportions for flexographic inks, the resin binder preferably constitutes from 1 to 30% of the ink weight and the dye preferably constitutes from 8 to 11% of the ink weight. It should be noted that unless otherwise specified, all proportions in the specification and claims are by weight.

The following examples will illustrate the compositions of this invention:

Example 1

|  | Parts by weight |
|---|---|
| Maleic acid modified phenolformaldehyde resin having a melting point of 135–145° C. and acid No. 60–90 | 11.7 |
| Nitrocellulose (30–35 sec.) | 2.1 |
| Polyterpene and phenolformaldehyde resin reaction product having an acid No. of 10 to 15 and melting point 100° C. (ball and ring) | 7.5 |
| Microcrystalline wax | 1.1 |
| 4,4-bis(p-hydroxyphenyl) pentanoic acid | 15.0 |
| Ethanol | 42.7 |
| n-Propyl acetate | 11.4 |

The above ingredients are mixed for a period of 15 to 20 minutes, after which 8.5 parts of Malachite Green [1] dye are added slowly over a period of 5 minutes at room temperature with continuous stirring. Stirring is continued for about 1 hour.

Example 2

Example 1 is repeated using the same procedure, ingredients and conditions except that in place of Malachite Green dye, Brilliant Green [2] dye is used.

[1] Malachite Green

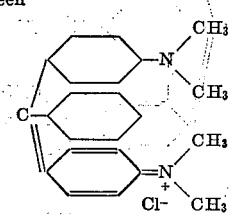

[2] Brilliant Green

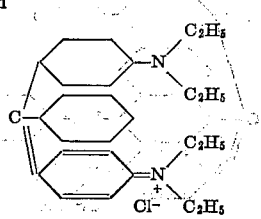

Example 3

| | Parts by weight |
|---|---|
| Maleic acid modified phenol-formaldehyde resin having a melting point of 135–145° C. and an acid No. 60–90 | 11.7 |
| Polyterpene and phenol-formaldehyde resin reaction product having an acid No. of 10–15 and melting point of 100° C. (ball and ring) | 8.0 |
| Micorcrystalline wax | 1.1 |
| Carbowax 200 (polyethylene glycol having an average molecular weight of 190–200) | 2.5 |
| 4,4-bis(p-hydroxyphenyl) pentanoic acid | 16.0 |
| Ethanol | 46.7 |
| Methanol | 4.7 |

The above ingredients are mixed for a period of 15 to 20 minutes, after which 8.5 parts of Methyl Violet [3] dye are added slowly over a period of 5 minutes at room temperature with continuous stirring. Stirring is continued for about an hour.

Example 4

Example 1 is repeated using the same procedure, ingredients and conditions except that in place of Malachite Green dye, Rhodamine B [4] Red dye is used.

Example 5

| | Parts by weight |
|---|---|
| Maleic acid modified phenolformaldehyde resin having a melting point of 135–145° C. and acid No. 60–90 | 11.7 |
| Nitrocellulose (30–35 sec.) | 2.1 |
| Polyterpene and phenol-formaldehyde resin reaction product having an acid No. of 10–15 and melting point of 100° C. (ball and ring) | 7.5 |
| Microcrystalline wax | 1.1 |
| 4,4-bis(p-hydroxyphenyl) pentanoic acid | 15.0 |
| Ethanol | 46.3 |
| n-Propyl acetate | 7.4 |

The above ingredients are mixed for a period of 15 to 20 minutes after which 8.5 parts of Victoria Blue [5] dye are added slowly over a period of 5 minutes at room temperature with continuous stirring. Stirring is continued for 1 hour.

Example 6

| | Parts by weight |
|---|---|
| Maleic acid modified phenol-formaldehyde resin having a melting point of 135–145° C. and an acid No. 60–90 | 11.7 |
| Polyterpene and phenol-formaldehyde resin reaction product having an acid No. of 10–15 and melting point of 100° C. (ball and ring) | 8.0 |
| Microcrystalline wax | 1.1 |
| Carbowax 200 (polyethylene glycol having an average molecular weight of 190–200) | 2.5 |
| 4,4-bis(p-hydroxyphenyl) pentanoic acid | 16.0 |
| Ethanol | 51.9 |

The above ingredients are mixed for a period of 15 to 20 minutes after which 8 parts of Auramine O [6] Yellow dye are added slowly over a period of 5 minutes at room temperature with continuous stirring. Stirring is continued for 1 hour.

Example 7

Example 6 is repeated using the same procedure, ingredients and conditions except that in place of Auramine O dye, Auramine G [7] dye is used.

The inks of Examples 1 through 7 are used for printing on glassine with a flexographic press. Then inks duplicating those of Examples 1 through 7 except for the absence of 4,4-bis(p-hydroxyphenyl) pentanoic acid are used for printing on the same type of glassine with the same press. In all seven cases the inks containing the 4,4-bis(p-hydroxyphenyl) pentanoic acid give stronger printed colors than do their corresponding inks without the pentanoic acid.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. A flexographic printing ink consisting essentially of a solution of from 15 to 30% of the weight of the ink of an alcohol-soluble resin, of from 8 to 11% of the weight of the ink of a dye selected from the group consisting of colored quaternary ammonium triphenylmethane salts and colored quaternary ammonium diphenylmethane salts and from 10 to 20% of the weight of the ink of 4,4-bis(p-hydroxyphenyl) pentanoic acid in a predominantly lower alkanol solvent, said lower alkanol being selected from the group consisting of alkanols having from 1 to 3 carbon atoms.

---

[3] Methyl Violet

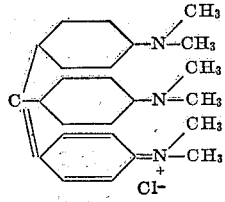

[4] Rhodamine B

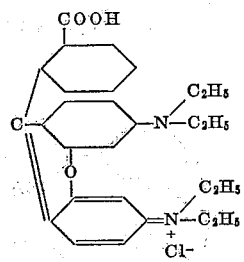

[5] Victoria Blue B

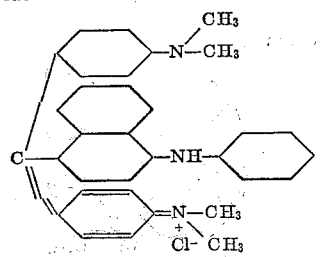

[6] Auramine O

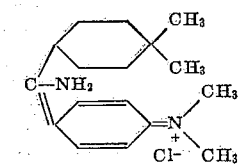

[7] Auramine G

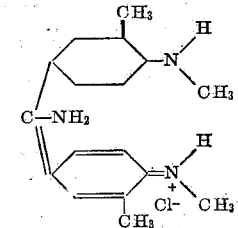

2. The printing ink of Example 1 wherein said alkanol comprises methanol.

3. The printing ink of Example 1 wherein said alkanol is primarily ethanol.

4. The printing ink of Example 1 wherein the lower alkanol constitutes at least 75% of the solvent by weight.

5. The method of increasing the solubility of a dye selected from the group consisting of colored quaternary ammonium triphenylmethane salts and colored quaternary ammonium diphenylmethane salts in a predominantly lower alkanol solvent, said lower alkanol being selected from the group consisting of alkanols having from 1 to 3 carbon atoms, which comprises adding 4,4-bis(p-hydroxyphenyl) pentanoic acid to a mixture of the dye and solvent.

References Cited

UNITED STATES PATENTS

| | | | |
|---|---|---|---|
| 2,755,201 | 7/1956 | Webber et al. | 260—393 X |
| 2,999,026 | 9/1961 | Davis | 106—23 |
| 3,108,896 | 8/1963 | Owen | 117—36.8 |
| 3,244,549 | 4/1966 | Farnham et al. | 260—393 X |
| 3,244,550 | 4/1966 | Farnham et al. | 260—393 X |
| 3,268,461 | 8/1966 | Jacobson | 106—22 |

OTHER REFERENCES

American Ink Maker, vol. 40, No. 2, pp. 29–30 ("Diphenolic Acid"), February 1962. TP 949 A512.

ALEXANDER H. BRODMERKEL, *Primary Examiner.*

J. B. EVANS, *Assistant Examiner.*